(12) United States Patent
Park et al.

(10) Patent No.: US 11,678,354 B2
(45) Date of Patent: Jun. 13, 2023

(54) DYNAMICALLY SWITCHING TRANSMISSION CONFIGURATION INDICATION STATES USING A SINGLE CONTROL RESOURCE SET

(71) Applicant: QUALCOMM Incorporated, San Diego, CA (US)

(72) Inventors: Sungwoo Park, Seoul (KR); Mostafa Khoshnevisan, San Diego, CA (US); Tao Luo, San Diego, CA (US); Jing Sun, San Diego, CA (US); Xiaoxia Zhang, San Diego, CA (US); Arumugam Chendamarai Kannan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/115,465

(22) Filed: Dec. 8, 2020

(65) Prior Publication Data

US 2021/0235454 A1 Jul. 29, 2021

Related U.S. Application Data

(60) Provisional application No. 62/966,427, filed on Jan. 27, 2020.

(51) Int. Cl.
*H04W 72/53* (2023.01)
*H04W 72/0453* (2023.01)
(Continued)

(52) U.S. Cl.
CPC ........... *H04W 72/53* (2023.01); *H04L 1/0038* (2013.01); *H04W 72/0453* (2013.01); *H04W 72/23* (2023.01)

(58) Field of Classification Search
CPC ........... H04W 72/0493; H04W 72/042; H04W 72/0453; H04L 1/0038; H04L 1/0046;
(Continued)

(56) References Cited

U.S. PATENT DOCUMENTS

| 2011/0249633 A1* | 10/2011 | Hong ..................... H04L 5/0053 370/328 |
| 2019/0215701 A1* | 7/2019 | Honglei ................. H04W 16/28 |

(Continued)

FOREIGN PATENT DOCUMENTS

| EP | 2439995 A2 * | 4/2012 | ............. H04L 5/001 |
| WO | WO-2019096129 A1 * | 5/2019 | ........... H04B 17/373 |

(Continued)

OTHER PUBLICATIONS

International Search Report and Written Opinion—PCT/US2020/070892—ISA/EPO—dated Mar. 9, 2021.
(Continued)

*Primary Examiner* — Ayaz R Sheikh
*Assistant Examiner* — Tarell A Hampton
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, configuration information including multiple transmission configuration indication (TCI) states associated with a control resource set (CORESET). The UE may receive, from the base station, a physical downlink control channel (PDCCH) in a region associated with the CORESET, wherein the PDCCH includes at least one control channel element (CCE). The UE may perform blind decoding for multiple configured PDCCH candidates based at least in part on a resource element group (REG) bundle included in the at least one CCE, wherein the multiple configured PDCCH candidates
(Continued)

are associated with one or more of the multiple TC states associated with the CORESET. Accordingly, the UE may identify the PDCCH transmitted by the base station based at least in part on the blind decoding.

30 Claims, 9 Drawing Sheets

(51) Int. Cl.
*H04L 1/00* (2006.01)
*H04W 72/23* (2023.01)

(58) Field of Classification Search
CPC ... H04L 1/0072; H04L 5/0053; H04L 5/0023; H04L 5/0048
See application file for complete search history.

(56) References Cited

U.S. PATENT DOCUMENTS

| | | | |
|---|---|---|---|
| 2020/0029310 A1 | 1/2020 | Lee et al. | |
| 2020/0045709 A1* | 2/2020 | Seo | H04L 5/0051 |
| 2020/0153581 A1* | 5/2020 | Tsai | H04L 5/0035 |
| 2021/0045121 A1* | 2/2021 | Kim | H04W 72/042 |

FOREIGN PATENT DOCUMENTS

| | | | | |
|---|---|---|---|---|
| WO | WO-2019099880 A1 | * | 5/2019 | H04W 24/08 |
| WO | WO-2019130571 A1 | * | 7/2019 | H04W 16/28 |
| WO | WO-2019137306 A1 | * | 7/2019 | H04L 5/00 |
| WO | WO-2019141398 A1 | * | 7/2019 | H04B 7/0695 |
| WO | WO-2020031359 A1 | * | 2/2020 | H04L 5/0053 |
| WO | WO-2020033549 A1 | * | 2/2020 | H04L 5/0044 |
| WO | WO-2020122685 A1 | * | 6/2020 | H04L 1/1812 |
| WO | WO-2020122686 A1 | * | 6/2020 | H04L 1/1819 |
| WO | WO-2020122687 A1 | * | 6/2020 | H04B 7/0417 |

OTHER PUBLICATIONS

NTT Docomo Inc: "Enhancements on Multi-TRP/Panel Transmission", 3GPP Draft, R1-1911184, 3GPP TSG RAN WG1 #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 33 Pages, Oct. 4, 2019 (Oct. 4, 2019), XP051808317, Retrieved from the Internet: URL: https://ftp.3gpp.org/tsg_ran/WG1_RL1/TSGR1_98b/Docs/R1-1911184.zip R1-1911184.docx [retrieved on Oct. 4, 2019] Multiple PDCCH based Multi-TRP/Panel Transmission; p. 5, paragraph 2.2—p. 7 PDCCH enhancement; p. 7, paragraph 2.2.1—p. 8; figures 2-6, pp. 11-13, Section 1, Section 2.1.1, Section 2.2.1, the whole document.

* cited by examiner

DYNAMICALLY SWITCHING TRANSMISSION CONFIGURATION INDICATION STATES USING A SINGLE CONTROL RESOURCE SET

CROSS-REFERENCE TO RELATED APPLICATION

This Patent Application claims priority to U.S. Provisional Patent Application No. 62/966,427, filed on Jan. 27, 2020, entitled "DYNAMICALLY SWITCHING TRANSMISSION CONFIGURATION INDICATION STATES USING A SINGLE CONTROL RESOURCE SET," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamically switching transmission configuration indication (TCI) states using a single control resource set (CORESET).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: receiving, from a base station, configuration information related to a control resource set (CORESET), wherein the configuration information includes multiple transmission configuration indication (TCI) states associated with the CORESET; receiving, from the base station, a physical downlink control channel (PDCCH) in a region associated with the CORESET, wherein the PDCCH includes at least one control channel element (CCE); performing blind decoding for multiple configured PDCCH candidates based at least in part on a resource element group (REG) bundle included in the at least one CCE, wherein the multiple configured PDCCH candidates are associated with one or more of the multiple TCI states associated with the CORESET; and identifying the PDCCH transmitted by the base station based at least in part on the blind decoding.

In some aspects, a method of wireless communication, performed by a base station, may include: transmitting, to a UE, configuration information related to a CORESET, wherein the configuration information includes multiple TCI states associated with the CORESET; selecting, among multiple configured PDCCH candidates that are associated with one or more of the multiple TCI states, a PDCCH candidate to be transmitted to the UE; and transmitting a PDCCH to the UE in a region associated with the CORESET based at least in part on the selected PDCCH candidate, wherein the PDCCH includes an REG bundle in at least one CCE to indicate one or more of the multiple TCI states used to transmit the PDCCH.

In some aspects, a UE for wireless communication may include a memory and one or more processors operatively coupled to the memory. The memory and the one or more processors may be configured to: receive, from a base station, configuration information related to a CORESET, wherein the configuration information includes multiple TCI states associated with the CORESET; receive, from the base station, a PDCCH in a region associated with the CORESET, wherein the PDCCH includes at least one CCE; perform blind decoding for multiple configured PDCCH candidates based at least in part on an REG bundle included in the at least one CCE, wherein the multiple configured PDCCH candidates are associated with one or more of the multiple TCI states associated with the CORESET; and identify the PDCCH transmitted by the base station based at least in part on the blind decoding.

In some aspects, a base station for wireless communication may include a memory and one or more processors operatively coupled to the memory. The memory and the one or more processors may be configured to: transmit, to a UE, configuration information related to a CORESET, wherein the configuration information includes multiple TCI states associated with the CORESET; select, among multiple configured PDCCH candidates that are associated with one or more of the multiple TCI states, a PDCCH candidate to be transmitted to the UE; and transmit a PDCCH to the UE in a region associated with the CORESET based at least in part on the selected PDCCH candidate, wherein the PDCCH includes an REG bundle in at least one CCE to indicate one or more of the multiple TCI states used to transmit the PDCCH.

In some aspects, a non-transitory computer-readable medium may store one or more instructions for wireless communication. The one or more instructions, when executed by one or more processors of a UE, may cause the one or more processors to: receive, from a base station, configuration information related to a CORESET, wherein the configuration information includes multiple TCI states associated with the CORESET; receive, from the base station, a PDCCH in a region associated with the CORESET, wherein the PDCCH includes at least one CCE; perform blind decoding for multiple configured PDCCH candidates based at least in part on an REG bundle included in the at least one CCE, wherein the multiple configured PDCCH candidates are associated with one or more of the multiple TCI states associated with the CORESET; and identify the PDCCH transmitted by the base station based at least in part on the blind decoding.

In some aspects, a non-transitory computer-readable medium may store one or more instructions for wireless communication. The one or more instructions, when executed by one or more processors of a base station, may cause the one or more processors to: transmit, to a UE, configuration information related to a CORESET, wherein the configuration information includes multiple TCI states associated with the CORESET; select, among multiple configured PDCCH candidates that are associated with one or more of the multiple TCI states, a PDCCH candidate to be transmitted to the UE; and transmit a PDCCH to the UE in a region associated with the CORESET based at least in part on the selected PDCCH candidate, wherein the PDCCH includes an REG bundle in at least one CCE to indicate one or more of the multiple TCI states used to transmit the PDCCH.

In some aspects, an apparatus for wireless communication may include: means for receiving, from a base station, configuration information related to a CORESET, wherein the configuration information includes multiple TCI states associated with the CORESET; means for receiving, from the base station, a PDCCH in a region associated with the CORESET, wherein the PDCCH includes at least one CCE; means for performing blind decoding for multiple configured PDCCH candidates based at least in part on an REG bundle included in the at least one CCE, wherein the multiple configured PDCCH candidates are associated with one or more of the multiple TCI states associated with the CORESET; and means for identifying the PDCCH transmitted by the base station based at least in part on the blind decoding.

In some aspects, an apparatus for wireless communication may include: means for transmitting, to a UE, configuration information related to a CORESET, wherein the configuration information includes multiple TCI states associated with the CORESET; means for selecting, among multiple configured PDCCH candidates that are associated with one or more of the multiple TCI states, a PDCCH candidate to be transmitted to the UE; and means for transmitting a PDCCH to the UE in a region associated with the CORESET based at least in part on the selected PDCCH candidate, wherein the PDCCH includes an REG bundle in at least one CCE to indicate one or more of the multiple TCI states used to transmit the PDCCH.

Aspects generally include a method, apparatus, system, computer program product, non-transitory computer-readable medium, user equipment, base station, transmit receive point, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
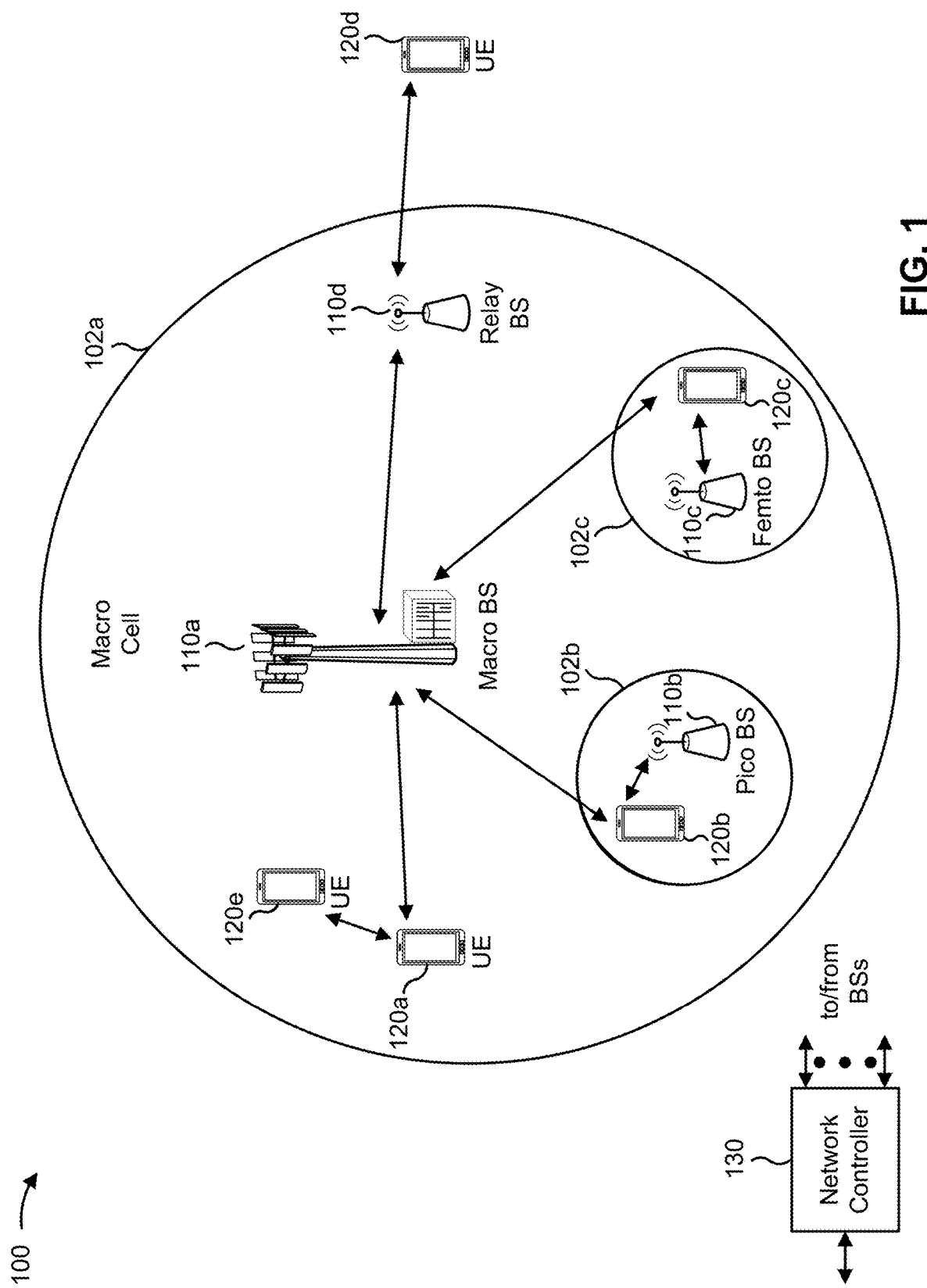
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gB", "TRP", "A", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things)

devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
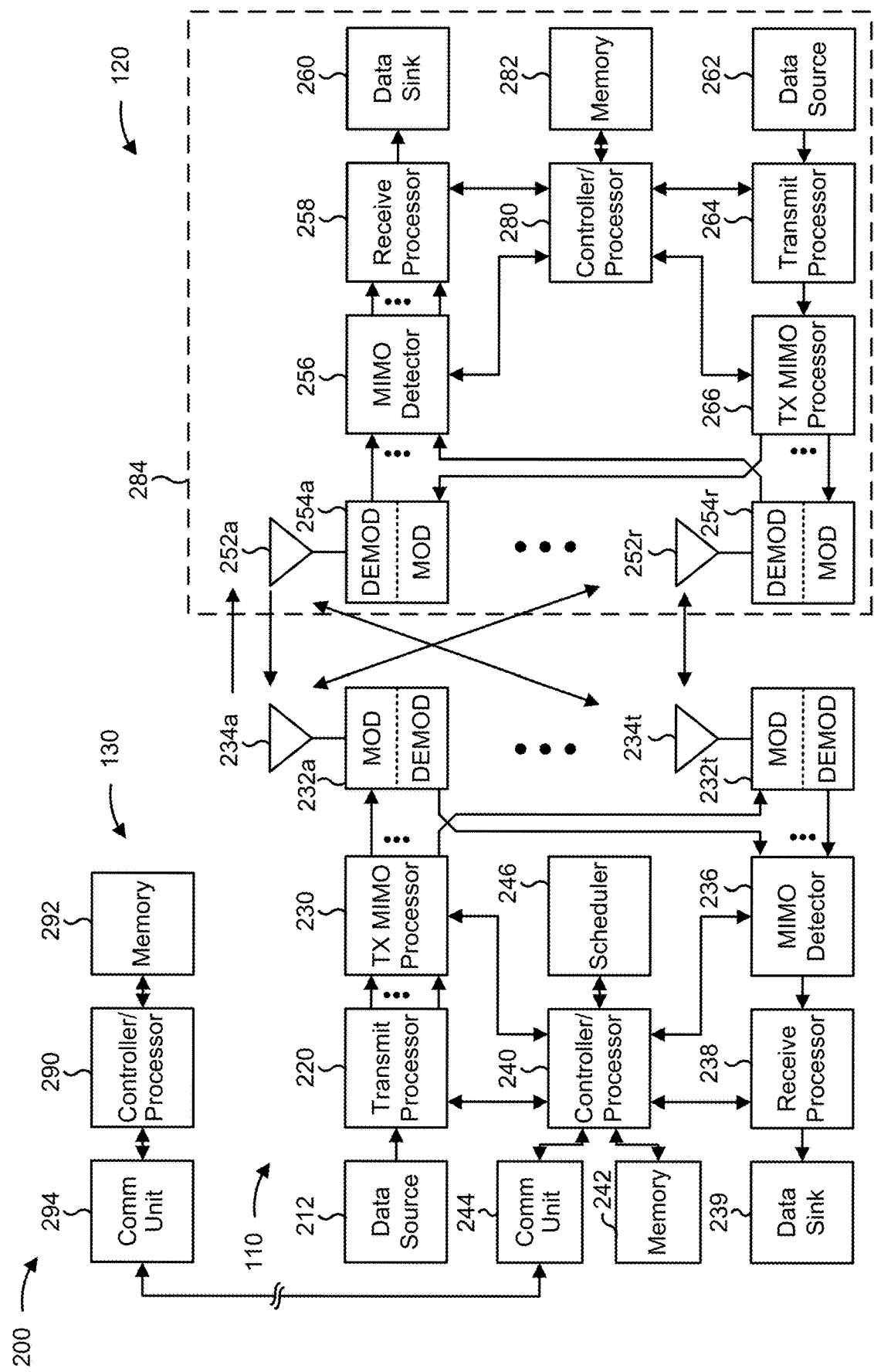
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with dynamically switching transmission configuration indication (TCI) states using a single control resource set (CORESET), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, UE 120 may include means for receiving, from base station 110, configuration information related to a CORESET, wherein the configuration information includes multiple TCI states associated with the CORESET, means for receiving, from base station 110, a physical downlink control channel (PDCCH) in a region associated with the CORESET, wherein the PDCCH includes at least one control channel element (CCE), means for performing blind decoding for multiple configured PDCCH candidates based at least in part on a resource element group (REG) bundle included in the at least one CCE, wherein the multiple configured PDCCH candidates are associated with one or more of the multiple TCI states associated with the CORESET, means for identifying the PDCCH transmitted by base station 110 based at least in part on the blind decoding, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, configuration information related to a CORESET, wherein the configuration information includes multiple TCI states associated with the CORESET, means for selecting, among multiple configured PDCCH candidates that are associated with one or more of the multiple TCI states, a PDCCH candidate to be transmitted to UE 120, means for transmitting a PDCCH to UE 120 in a region associated with the CORESET based at least in part on the selected PDCCH candidate, wherein the PDCCH includes an REG bundle in at least one CCE to indicate one or more of the multiple TCI states used to transmit the PDCCH, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
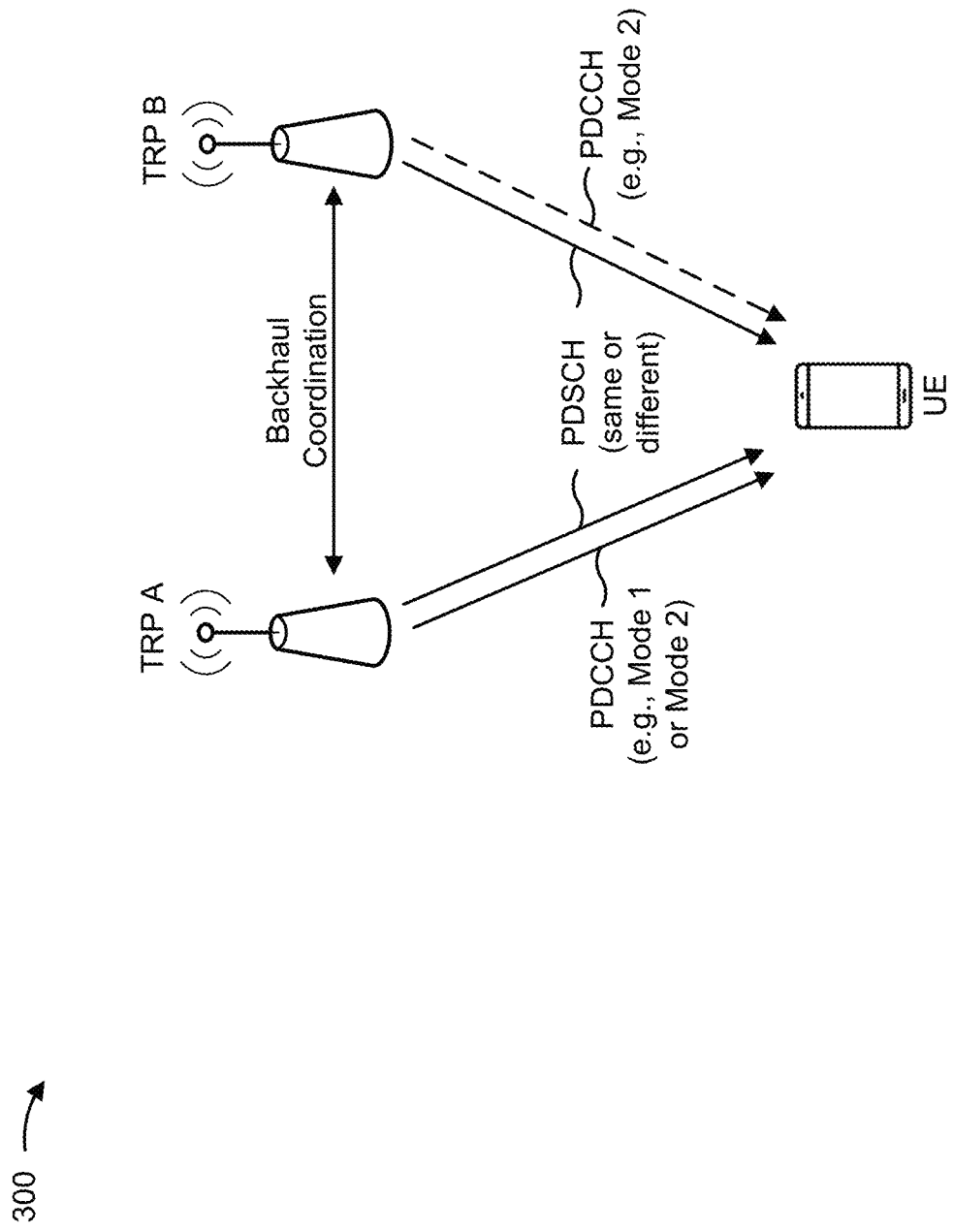
FIG. 3 is a diagram illustrating one or more examples of multi-transmit receive point (TRP) communication, in accordance with various aspects of the present disclosure.

FIG. 3 is a diagram illustrating one or more examples 300 of multi-TRP communication (sometimes referred to as multi-panel communication and/or the like), in accordance with various aspects of the present disclosure.

As shown in FIG. 3, multiple TRPs (shown as TRP A and TRP B) may communicate with a particular UE (e.g., UE 120) in a coordinated manner (e.g., using coordinated multipoint transmissions and/or the like) to improve diversity, improve reliability, increase throughput, and/or the like. In general, the TRPs may coordinate communications with the particular UE via a backhaul, which may have a smaller delay and/or a higher capacity when the TRPs are co-located at the same base station (e.g., different antenna arrays of the same base station). Alternatively, the backhaul may have a larger delay and/or a lower capacity (e.g., compared to co-location) when the TRPs are located at different base stations. In some aspects, the multiple TRPs may communicate with the UE 120 using different frequency resources (e.g., resource blocks (RBs)) in a frequency division multiplexing (FDM) scheme, using different time resources (e.g., symbols or slots) in a time division multiplexing (TDM) scheme, different spatial resources (e.g., quasi co-location (QCL) relationships, DMRS ports, spatial layers, and/or the like) in a spatial division multiplexing (SDM) scheme, and/or the like.

In a first multi-TRP transmission mode (e.g., Mode 1), the multiple TRPs may be configured to transmit a single physical downlink control channel (PDCCH) to schedule downlink data communications for a single physical downlink shared channel (PDSCH). In this case, the multiple TRPs may transmit communications to the UE on the same PDSCH. For example, different TRPs may transmit the PDSCH as a single codeword using different spatial layers (e.g., in an SDM scheme), different RBs (e.g., in an FDM scheme), different symbols or slots (e.g., in a TDM scheme). As another example, a PDSCH communication may be transmitted using multiple codewords, where different codewords are transmitted by different TRPs using different spatial layers, frequency resources, time resources, and/or the like. In either case, the different resources that the multiple TRPs use to transmit the PDSCH may generally have different transmission configuration indication (TCI) states. For example, the PDCCH scheduling the PDSCH may include one downlink control information (DCI) message having a TCI field to indicate the TCI state(s) for the PDSCH.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP (e.g., TRP A), and a second PDCCH may schedule a second codeword to be transmitted by a second TRP (e.g., TRP B). Furthermore, first DCI (e.g., transmitted by the first TRP) may schedule a first PDSCH communication associated with a first TCI for the first TRP, and second DCI (e.g., transmitted by the second TRP) may schedule a second PDSCH communication associated with a second TCI for the second TRP. In this case, separate DCI may indicate TCI states for the multiple corresponding PDSCHs.

Accordingly, in a multi-TRP communication scenario, diversity, reliability, performance, and/or the like may generally be improved by enabling a UE to receive a downlink communication from multiple TRPs using different frequency resources, different time resources, different spatial resources, and/or the like, which are generally associated with different TCI states. However, existing multi-TRP communication schemes typically support multiple TCI states for a PDSCH only. In other words, existing multi-TRP communication schemes lack support for a single PDCCH to have multiple TCI states. For example, as described above, in a multi-TRP communication scenario, one TRP may be configured to transmit a single PDCCH that includes DCI to schedule a PDSCH that may have multiple TCI states. Furthermore, in cases where different TRPs transmit different PDCCHs to schedule downlink data communications for multiple corresponding PDSCHs, a control resource set (CORESET) containing each PDCCH has only one TCI state. Accordingly, the lack of support for a single PDCCH to have multiple TCI states may reduce reliability of the PDCCH, which may reduce overall reliability in the multi-TRP communication scenario because overall reliability can only be satisfied if all channels are reliable. Furthermore, although one technique to switch between using one TCI state for PDCCH transmission and using two TCI states for PDCCH transmission may be to use three different CORESETs, including a first CORESET associated with a first TCI state, a second CORESET associated with a second TCI state, and a third CORESET associated with the first and second TCI states, this approach is generally inefficient and consumes significant resources. Furthermore, this inefficiency may increase as the number of TRPs in the multi-TRP communication scenario (and therefore possible TCI states) increases.

Some aspects described herein provide techniques and apparatuses to dynamically switch TCI states used for PDCCH transmission using a single CORESET. For example, some aspects described herein relate to a CORESET configuration in which different control channel element (CCE) types are used to indicate one or more TCI state(s) used for PDCCH transmission. For example, in some aspects, a CCE may include a resource element group (REG) bundle, whereby a CCE may be associated with one TCI state when each REG in the REG bundle is associated with the one TCI state. Additionally, or alternatively, a CCE may be associated with multiple TCI states when the REG bundle includes REGs that are associated with different TCI states. Accordingly, a base station may configure multiple PDCCH candidates that may be used to indicate the TCI state(s) to be used for PDCCH transmission, where each PDCCH candidate may include one or more CCEs.

In this way, the base station may select an appropriate PDCCH candidate to configure a single CORESET to indicate the TCI state(s) to be used for PDCCH transmission, and a UE may blindly decode all possible PDCCH candidates to determine the TCI state(s) to be used for PDCCH transmission. For example, when the CCE(s) included in the single CORESET are all associated with a particular TCI state, the UE may determine that the particular TCI state is to be used for PDCCH transmission. In another example, when the CCE(s) included in the single CORESET include REGs that are associated with multiple TCI states, the UE may determine the multiple TCI states that are to be used for PDCCH transmission based at least in part on the REGs that are included in the CCE(s). In this way, a PDCCH may be associated with one or more TCI states, and a single CORESET may be used to dynamically switch the TCI state(s) used for PDCCH transmission, which increases reliability of the PDCCH, overall reliability of the multi-TRP communication, efficiency of the CORESET transmission, and/or the like.

As indicated above, FIG. 3 is provided as one or more examples. Other examples may differ from what is described with regard to FIG. 3.

Figure 4A:
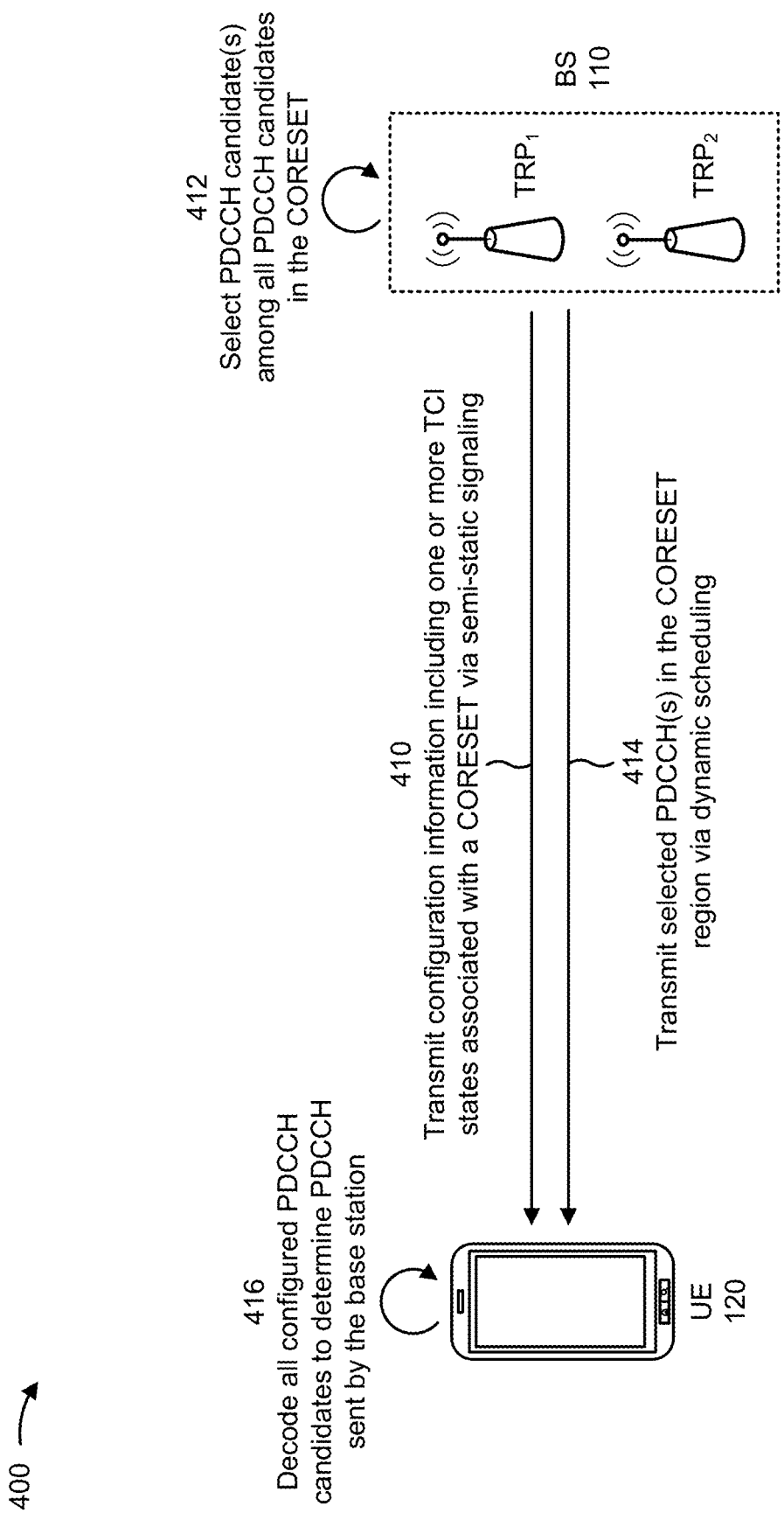
FIGS. 4A-4D are diagrams illustrating one or more examples of dynamically switching transmission configuration indication (TCI) states using a single control resource set (CORESET), in accordance with various aspects of the present disclosure.

FIGS. 4A-4D are diagrams illustrating one or more examples 400 of dynamically switching TCI states using a single CORESET, in accordance with various aspects of the present disclosure. As shown in FIG. 4A, multiple TRPs (shown as $TRP_1$ and $TRP_2$) may communicate with a UE 120. In some aspects, the multiple TRPs may be included in a single base station 110. In some aspects, the multiple TRPs may include different subsets of TRPs that are included in different base stations 110. Although FIG. 4A illustrates two TRPs communicating with the UE 120, in some aspects, a different quantity of TRPs (e.g., three TRPs, four TRPs, and/or the like) may communicate with the UE 120 in multi-TRP operation. Some operations may be described herein as being performed by a base station 110. Such operations may be performed by a single TRP included in the base station 110 or by multiple TRPs included in the base station 110.

As shown in FIG. 4A, and by reference number 410, the base station 110 may transmit, and the UE 120 may receive, configuration information including one or more TCI states associated with a CORESET via semi-static signaling (e.g., radio resource control (RRC) signaling, a medium access control (MAC) control element (MAC-CE), and/or the like). In some aspects, the configuration information may generally indicate the one or more TCI states associated with the CORESET to define a set of configured PDCCH candidates that may be used to transmit a PDDCH to the UE 120. For example, the UE 120 and the base station 110 may communicate in a wireless network in which a particular quantity of TCI states are configured (e.g., sixty-four possible TCI states), and the configuration information may indicate, among the quantity of TCI states configured in the wireless network, the one or more TCI states that are associated with the CORESET. In this way, the UE 120 can determine which TCI state(s) are to be used for PDCCH decoding. For example, in some aspects, the PDCCH may be transmitted to the UE 120 using a first TCI state associated with a first TRP among the multiple TRPs (e.g., $TRP_1$), using a second TCI state associated with a second TRP among the multiple TRPs (e.g., $TRP_2$), and/or the like. Additionally, or alternatively, the PDCCH may be transmitted to the UE 120 using multiple TCI states that are associated with multiple TRPs (e.g., the first TCI state associated with the first $TRP_1$ and the second TCI state associated with the second $TRP_2$). Accordingly, although the UE 120 may not know in advance which TCI state(s) will actually be used for PDCCH transmission, the configuration information may indicate the one or more TCI state(s) associated with the CORESET to constrain the possible permutations of the TCI state(s) that can be used for PDCCH transmission (e.g., the first TCI state associated with the first $TRP_1$, the second TCI state associated with the second $TRP_2$, or both the first TCI state and the second TCI state). While example(s) 400 described herein relate to implementations in which a PDCCH may be transmitted using one TCI state (e.g., a TCI state associated with $TRP_1$ or $TRP_2$) or using two TCI states (e.g., different TCI states associated with $TRP_1$ and $TRP_2$), similar techniques may be used to configure PDCCH transmission using a greater quantity of TCI states.

In some aspects, the configuration information related to the CORESET may indicate different CCE types that may be included in the CORESET to indicate one or more TCI states that the base station 110 may subsequently use for PDCCH transmission. For example, in some aspects, the CCE types may include one or more CCE types that are associated with individual TCI states that are available to use for PDCCH transmission. Furthermore, in some aspects, the CCE types may include one or more CCE types that are associated with multiple TCI states that are available to use for PDCCH transmission. For example, in a multi-TRP communication system including two TRPs, the CCE types may include a first CCE type associated with a first TCI state and a second CCE type associated with a second TCI state. Furthermore, in some aspects, the CCE types may include a third CCE type that is associated with both the first TCI state and the second CCE type. Accordingly, as described herein, the configured PDCCH candidates may generally include one or more CCE types to indicate the particular TCI state(s) to be used for PDCCH transmission.

For example, in some aspects, a configured PDCCH candidate may generally include one or more CCEs depending on an aggregation level for the configured PDCCH candidate. For example, a PDCCH candidate may include one CCE at aggregation level 1, two CCEs at aggregation level 2, four CCEs at aggregation level 4, eight CCEs at aggregation level 8, or sixteen CCEs at aggregation level 16. Each CCE included in a particular PDCCH candidate may include a resource element group (REG) bundle including multiple REGs (e.g., six REGs), and each REG in an REG bundle may include one RB (twelve resource elements in a frequency domain and one OFDM symbol in a time domain). Accordingly, each CCE included in a PDCCH candidate may be associated with one or more TCI states. For example, in a CCE associated with an individual TCI state, all REGs included in the CCE are associated with the individual TCI state. In another example, in a CCE associated with two TCI states, one or more REGs included in the CCE may be associated with a first TCI state and one or more REGs included in the CCE may be associated with a second TCI state.

As further shown in FIG. 4A, and by reference number 412, the base station 110 may select, among all PDCCH candidates in the CORESET, a PDCCH candidate associated with one or more TCI states to be used to transmit a PDCCH to the UE 120. For example, in some aspects, the configured PDCCH candidates may include one or more PDCCH candidates that are associated with individual TCI states, one or more PDCCH candidates that are associated with multiple (different) TCI states, and/or the like. Accordingly, the base station 110 may dynamically switch between transmitting the PDCCH using individual TCI states and/or using multiple TCI states based at least in part on the configured CCE types. For example, to transmit the PDCCH using a particular TCI state (e.g., a TCI state associated with a particular TRP), the base station 110 may select a PDCCH candidate that includes one or more CCEs in which all of the REGs are associated with the particular TCI state. Additionally, or alternatively, to simultaneously or concurrently transmit the PDCCH using multiple TCI states, the base station 110 may select a PDCCH candidate that includes one or more CCEs with one or more REGs that are associated with each of the multiple TCI states. For example, in some aspects, the base station 110 may select a PDCCH candidate including one or more CCEs that include REGs associated with different TCI states, or the base station 110 may select a PDCCH candidate that mixes CCEs associated with individual TCI states at a higher aggregation level (e.g., a first CCE in which all of the REGs are associated with a first TCI state and a second CCE in which all of the REGs are associated with a second TCI state). In some aspects, the base station 110 may select the PDCCH candidate to be transmitted to the UE 120 in each scheduling occasion.

As further shown in FIG. 4A, and by reference number 414, the base station 110 may transmit, and the UE may receive, the selected PDCCH(s) in a region associated with the CORESET via dynamic signaling (e.g., DCI) in each scheduling occasion. For example, the transmitted PDCCH may include one or more CCEs that are associated with the TCI state(s) used to transmit the PDCCH to the UE 120. For example, as described in further detail elsewhere herein, the PDCCH may include one CCE at aggregation level 1, two CCEs at aggregation level 2, and/or the like. Accordingly, in some aspects, the TCI state(s) used to transmit the PDCCH may be indicated based at least in part on a configuration of the REGs that are included in the one or more CCEs of the CORESET region.

As further shown in FIG. 4A, and by reference number 416, the UE 120 may blindly decode all configured PDCCH candidates to determine the PDCCH transmitted from the base station 110 to the UE 120. For example, as described above, the UE 120 does not know (in advance) which TCI state(s) are used to transmit the PDCCH, whereby the UE 120 may attempt to decode all PDCCH candidates using the possible combinations of TCI states indicated in the configuration information related to the CORESET. For example, if the configuration information related to the CORESET indicates that the CORESET is associated with a first TCI state having a first identifier and a second TCI state having a second identifier, the UE may attempt to decode any PDCCH candidates that are associated with the first TCI state only, the second TCI state only, or the first and second TCI states. Accordingly, the UE 120 may perform cyclic redundancy code (CRC) checking to identify the PDCCH actually transmitted by the base station 110 based at least in part on the blind decoding. For example, in some aspects, the UE 120 may identify frequency resources, time resources, spatial resources, and/or the like that are occupied by the REGs included in the one or more CCEs of the single CORESET. Accordingly, the UE 120 may determine the PDCCH candidate to be used to transmit the PDCCH based at least in part on the resources that the REGs occupy. For example, as described in further detail below, the UE 120 may determine the PDCCH candidate to be used based at least in part on a CCE-to-REG mapping, which may generally vary depending on whether the multi-TCI scheme used for the PDCCH is a frequency division multiplexing (FDM) scheme, a time division multiplexing (TDM) scheme, or a spatial division multiplexing (SDM) scheme. In this way, the UE 120 may determine the TCI state(s) used to transmit the PDCCH, which may enable the UE 120 to receive the PDCCH that the base station 110 transmits to the UE 120 via one or more TRPs that are associated with the activated TCI state(s).

Figure 4B:
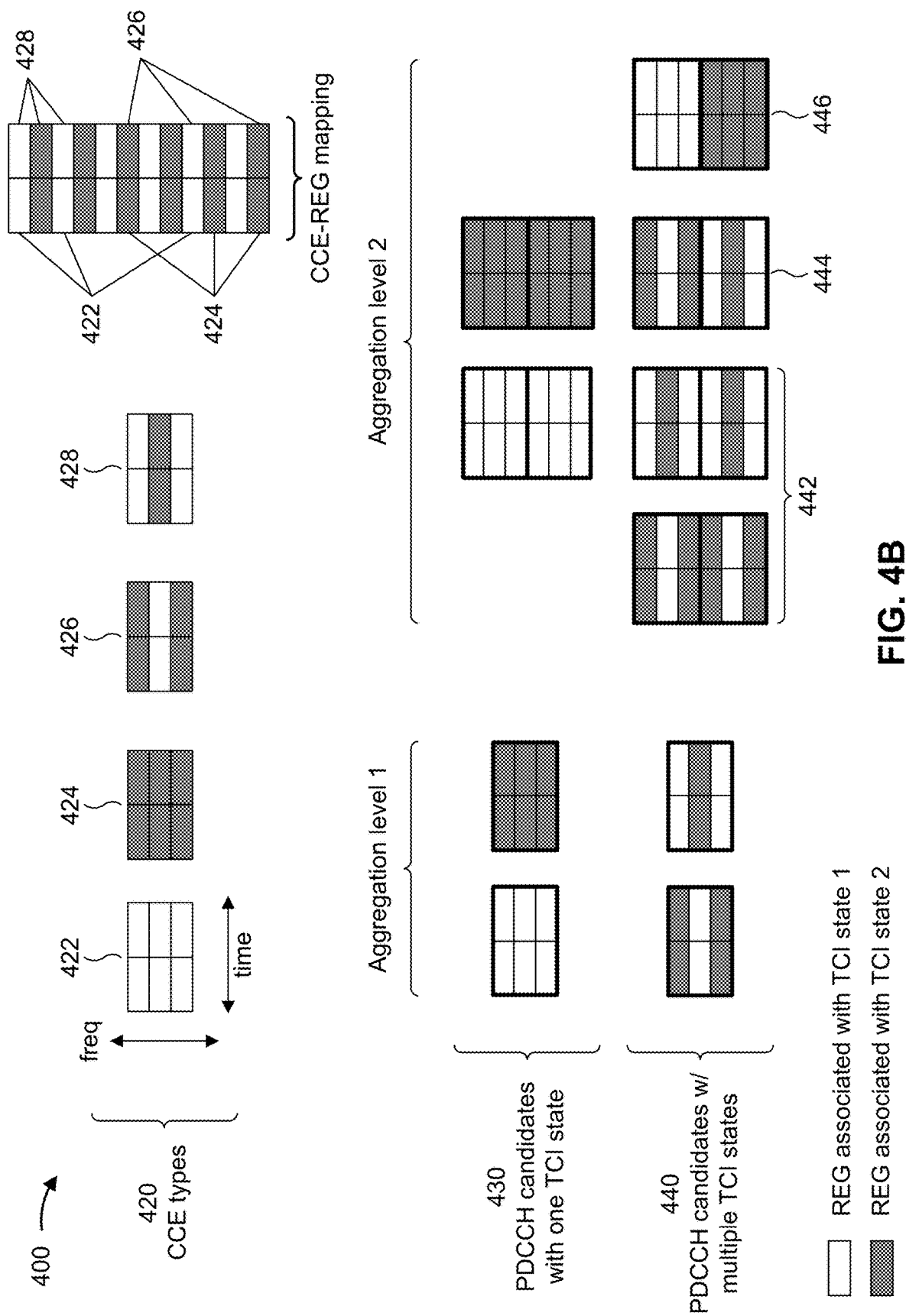

For example, FIG. 4B illustrates an example of a CCE-to-REG mapping for CCEs types and PDCCH candidates that may be used in an FDM scheme in which two TCI states are available to use for PDCCH transmission. It will be appreciated, however, that similar techniques may be applied in circumstances where more than two TCI states are available to use for PDCCH transmission. As shown by reference number 420, the CCE types may include a first CCE type 422 that includes an REG bundle in which each REG occupies frequency resources associated with a first TCI state and a second CCE type 424 that includes an REG bundle in which each REG occupies frequency resources that are associated with a second TCI state. Furthermore, as shown by reference numbers 426 and 428, the CCE types may include one or more CCE types in which one or more REGs occupy frequency resources associated with the first TCI state and one or more REGs occupy frequency resources associated with the second TCI state. In general, the frequency resources that are occupied by the REGs may be consecutive (e.g., non-interleaved) or non-consecutive (e.g., interleaved). Furthermore, the time resources that are occupied by the REGs may be consecutive symbols or slots, or non-consecutive symbols or slots.

As further shown in FIG. 4B, and by reference number 430, multiple PDCCH candidates may be configured to indicate one TCI state to be used for PDCCH transmission in the FDM scheme. For example, the PDCCH candidates include one CCE at aggregation level 1, two CCEs at aggregation level 2, and/or the like. Accordingly, to indicate one TCI state at aggregation level 1, the base station 110 may select a PDCCH candidate that includes one CCE in which all of the REGs occupy frequency resources associated with a particular TCI state (e.g., CCE type 422 or CCE type 424, depending on which TCI state is to be used for PDCCH transmission). Similarly, to indicate one TCI state at aggregation level 2, the base station 110 may select a PDCCH candidate that includes two CCEs in which all of the REGs occupy frequency resources associated with a particular TCI state (e.g., two of CCE type 422 or two of CCE type 424). Furthermore, similar techniques may be applied at higher aggregation levels (e.g., aggregation level 4, 8, or 16).

As further shown in FIG. 4B, and by reference number 440, different PDCCH candidates may be configured to indicate multiple TCI state that are to be used for PDCCH transmission in the FDM scheme. For example, the PDCCH candidates include one CCE at aggregation level 1, two CCEs at aggregation level 2, and/or the like. Accordingly, to indicate two TCI states at aggregation level 1, the base station 110 may select a PDCCH candidate that includes one CCE in which some of the REGs occupy frequency resources associated with a first TCI state and some of the REGs occupy frequency resources associated with a second TCI state (e.g., CCE type 426 or CCE type 428). Similarly, to indicate one TCI state at aggregation level 2, the base station 110 may select a PDCCH candidate that includes two CCEs in which some of the REGs occupy frequency resources associated with the first TCI state and some of the REGs occupy frequency resources associated with the second TCI state. For example, as shown by reference number 442, a PDCCH candidate associated with two TCI states may include CCEs in which some REGs occupy frequency resources associated with the first TCI state and some REGs occupy frequency resources associated with the second TCI state (e.g., two of CCE type 426 or two of CCE type 428). Additionally, or alternatively, as shown by reference number 444, a PDCCH candidate associated with two TCI states may mix different CCE types that are associated with different TCI states (e.g., one of CCE type 426 and one of CCE type 428). Additionally, or alternatively, as shown by reference number 446, a PDCCH candidate associated with two TCI states may mix different CCE types that are associated with individual TCI states (e.g., one of CCE type 422 and one of CCE type 424). Furthermore, similar techniques may be applied at higher aggregation levels.

Figure 4C:
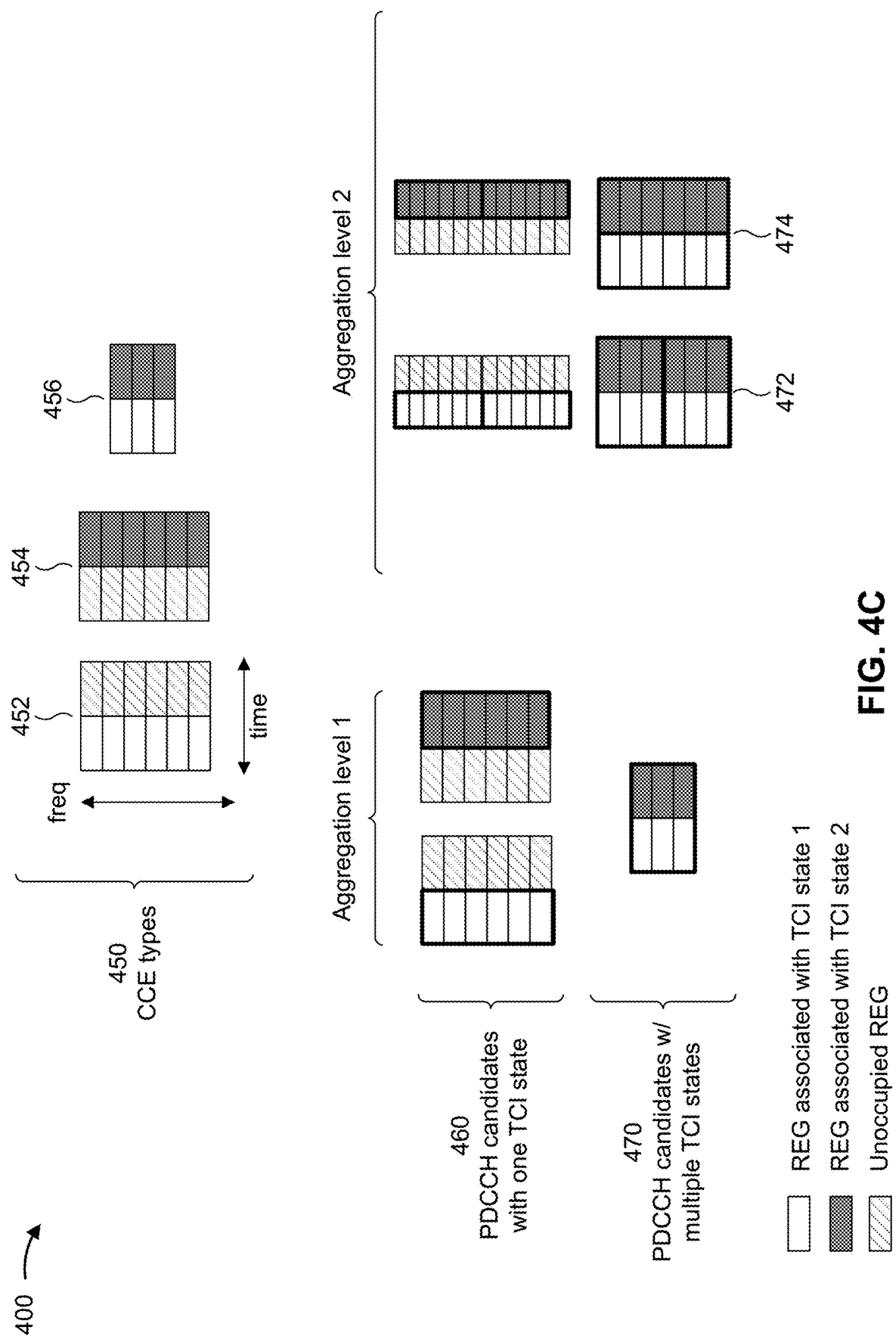

In another example, FIG. 4C illustrates example CCEs types and PDCCH candidates that may be used in an TDM scheme in which two TCI states are available to use for PDCCH transmission. It will be appreciated, however, that similar techniques may be applied in circumstances where more than two TCI states are available to use for PDCCH transmission. As shown by reference number 450, the CCE types may include a first CCE type 452 and a second CCE type 454 that are associated with one TCI state. For example, the first CCE type 452 includes an REG bundle in which all of the REGs occupy time resources associated with a first TCI state (e.g., a first symbol or slot) and further in which time resources associated with a second TCI state (e.g., a second symbol or slot) are unoccupied. Furthermore, the second CCE type 454 includes an REG bundle in which all of the REGs occupy time resources that are associated with the second TCI state, while time resources associated with the first TCI state are unoccupied. Furthermore, the CCE types include a third CCE type 456 associated with two TCI states. For example, in the third CCE type 456, some REGs occupy time resources associated with the first TCI state and some REGs occupy time resources associated with the second TCI state. In general, in the TDM scheme, the frequency and time resources occupied by the REGs may be consecutive or non-consecutive.

As further shown in FIG. 4C, and by reference number 460, multiple PDCCH candidates may be configured to indicate one TCI state to be used for PDCCH transmission in the TDM scheme. For example, the PDCCH candidates include one CCE at aggregation level 1, two CCEs at aggregation level 2, and/or the like. Accordingly, to indicate one TCI state at aggregation level 1, the base station 110 may select a PDCCH candidate that includes one CCE in which all of the REGs occupy time resources associated with a particular TCI state (e.g., CCE type 452 or CCE type 454, depending on which TCI state is to be used for PDCCH transmission). Similarly, to indicate one TCI state at aggregation level 2, the base station 110 may select a PDCCH candidate that includes two CCEs in which all of the REGs occupy time resources associated with a particular TCI state (e.g., two of CCE type 452 or two of CCE type 454). Furthermore, similar techniques may be applied at higher aggregation levels.

As further shown in FIG. 4C, and by reference number 470, different PDCCH candidates may be configured to indicate multiple TCI state that are to be used for PDCCH transmission in the TDM scheme. For example, the PDCCH candidates include one CCE at aggregation level 1, two CCEs at aggregation level 2, and/or the like. Accordingly, to indicate two TCI states at aggregation level 1, the base station 110 may select a PDCCH candidate that includes one CCE (e.g., CCE type 456) in which some of the REGs occupy time resources associated with the first TCI state and some of the REGs occupy time resources associated with the second TCI state. Similarly, to indicate one TCI state at aggregation level 2, the base station 110 may select a PDCCH candidate that includes two CCEs in which some of the REGs occupy time resources associated with the first TCI state and some of the REGs occupy time resources associated with the second TCI state. For example, as shown by reference number 472, a PDCCH candidate associated with two TCI states may have two CCEs that each include some REGs occupying time resources associated with the first TCI state and some REGs occupying time resources associated with the second TCI state (e.g., two of CCE type 456). Additionally, or alternatively, as shown by reference number 474, a PDCCH candidate associated with two TCI states may mix different CCE types that are associated with different individual TCI states (e.g., CCE types 452 and 454 may be mixed within the PDCCH candidate shown by reference number 474). Furthermore, similar techniques may be applied at higher aggregation levels.

Figure 4D:
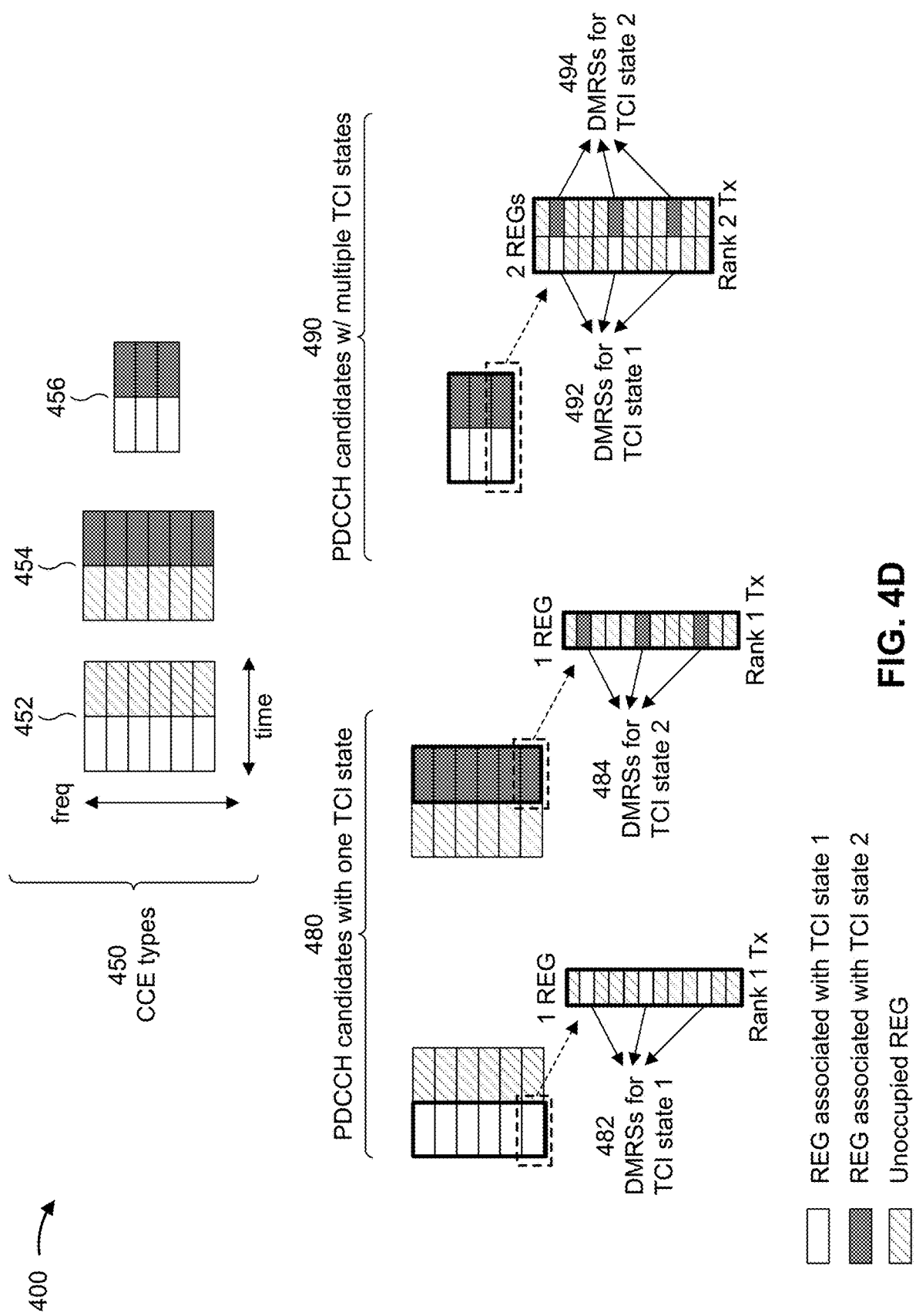

In another example, FIG. 4D illustrates example CCEs types and PDCCH candidates that may be used in an SDM scheme in which two TCI states are available to use for PDCCH transmission. It will be appreciated, however, that similar techniques may be applied in circumstances where more than two TCI states are available to use for PDCCH transmission. In general, the CCE types that are available to use for PDCCH transmission in the SDM scheme may be similar to the CCE types that are that are available to use for PDCCH transmission in the TDM scheme described in further detail above. However, in the SDM scheme, an REG included in a CCE may include one or more resource elements that include demodulation reference signals (DMRSs) for corresponding TCI states.

As shown by reference number 480, a PDCCH candidate associated with one TCI state may include an REG bundle in which each REG occupies time resources associated with a particular TCI state while time resources associated with other TCI states are unoccupied. Furthermore, one or more REGs may include a set of resource elements including one or more resource elements that contain the DMRSs for the corresponding TCI state. For example, as shown by reference numbers 482 and 484, a PDCCH candidate associated with one TCI state may include an individual CCE at aggregation level 1, and the individual CCE may include at least one REG with one or more resource elements that contain the DMRSs for the corresponding TCI state. Furthermore, as shown by reference number 490, a PDCCH candidate associated with multiple TCI states may include an REG bundle in which some REGs occupy time resources associated with each of the multiple TCI states. In this case, as shown by reference numbers 492 and 494, the PDCCH candidate associated with multiple TCI states may include an individual CCE at aggregation level 1 (e.g., CCE type 456), and the individual CCE may include at least one REG with one or more resource elements that contain the DMRSs for each corresponding TCI state. Additionally, as shown in FIG. 4D, the UE 120 may assume a particular rank for the PDCCH candidates depending on a quantity of TCI states that are associated with each PDCCH candidate. For example, during blind decoding, the UE 120 may assume rank 1 for PDCCH candidates that are associated with one TCI state, rank 2 for PDCCH candidates that are associated with two TCI states, and/or the like. Furthermore, it will be appreciated that the techniques described herein with respect to aggregation level 1 may be directly extended to higher aggregation levels (e.g., aggregation level 2, 4, 8, or 16).

As indicated above, FIGS. 4A-4D are provided as one or more examples. Other examples may differ from what is described with regard to FIGS. 4A-4D.

Figure 5:
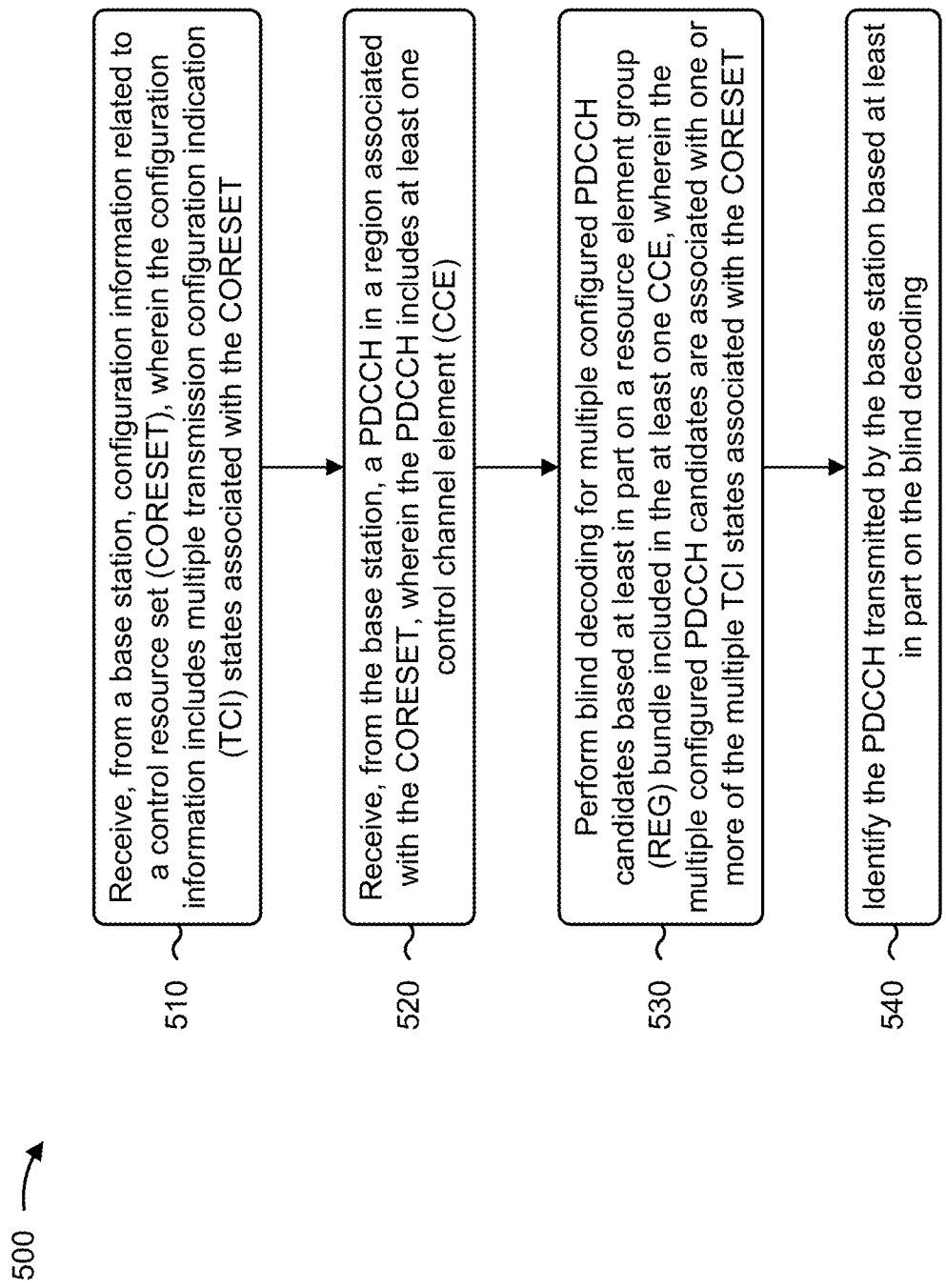
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with dynamically switching TCI states using a single CORESET.

As shown in FIG. 5, in some aspects, process 500 may include receiving, from a base station, configuration information related to a CORESET, wherein the configuration information includes multiple TCI states associated with the CORESET (block 510). For example, the UE may receive (e.g., using antenna 252, DEMOD 254, MIMO detector 256, receive processor 258, controller/processor 280, memory 282, and/or the like), from a base station, configuration information related to a CORESET, as described above. In some aspects, the configuration information includes multiple TCI states associated with the CORESET.

As further shown in FIG. 5, in some aspects, process 500 may include receiving, from the base station, a PDCCH in a region associated with the CORESET, wherein the PDCCH includes at least one CCE (block 520). For example, the UE may receive (e.g., using antenna 252, DEMOD 254, MIMO detector 256, receive processor 258, controller/processor 280, memory 282, and/or the like), from the base station, a PDCCH in a region associated with the CORESET, as described above. In some aspects, the PDCCH includes at least one CCE.

As further shown in FIG. 5, in some aspects, process 500 may include performing blind decoding for multiple configured PDCCH candidates based at least in part on an REG bundle included in the at least one CCE, wherein the multiple configured PDCCH candidates are associated with one or more of the multiple TCI states associated with the CORESET (block 530). For example, the UE may perform (e.g., using controller/processor 280, memory 282, and/or the like) blind decoding for multiple configured PDCCH candidates based at least in part on an REG bundle included in the at least one CCE, as described above. In some aspects, the multiple configured PDCCH candidates are associated with one or more of the multiple TCI states associated with the CORESET.

As further shown in FIG. 5, in some aspects, process 500 may include identifying the PDCCH transmitted by the base station based at least in part on the blind decoding (block 540). For example, the UE may identify (e.g., using controller/processor 280, memory 282, and/or the like) the PDCCH transmitted by the base station based at least in part on the blind decoding, as described above.

Process 500 may include additional aspects, such as any single aspect or any combination of aspects described below and/or in connection with one or more other processes described elsewhere herein.

In a first aspect, process 500 includes determining a CCE type associated with the at least one CCE based at least in part on the REG bundle included in the at least one CCE, where the PDCCH transmitted by the base station is identified based at least in part on the CCE type associated with the at least one CCE.

In a second aspect, alone or in combination with the first aspect, the CCE type is one of multiple CCE types including at least a first CCE type associated with a first TCI state and a second CCE type associated with a second TCI state, and the first TCI state and the second TCI state are included among the multiple TCI states associated with the CORESET.

In a third aspect, alone or in combination with one or more of the first and second aspects, the multiple CCE types further include a third CCE type associated with the first TCI state and the second TCI state.

In a fourth aspect, alone or in combination with one or more of the first through third aspects, process 500 includes determining that the at least one CCE is associated with one of the multiple TCI states associated with the CORESET based at least in part on the REG bundle including a plurality of REGs that are all associated with the one TCI state.

In a fifth aspect, alone or in combination with one or more of the first through fourth aspects, process 500 includes determining that the at least one CCE is associated with at least two of the multiple TCI states associated with the CORESET based at least in part on the REG bundle including a first set of REGs associated with a first TCI state and a second set of REGs associated with a second TCI state.

In a sixth aspect, alone or in combination with one or more of the first through fifth aspects, the PDCCH transmitted by the base station is identified based at least in part on frequency resources that are occupied by a plurality of REGs included in the REG bundle.

In a seventh aspect, alone or in combination with one or more of the first through sixth aspects, the PDCCH transmitted by the base station is identified based at least in part on time resources that are occupied by a plurality of REGs included in the REG bundle.

In an eighth aspect, alone or in combination with one or more of the first through seventh aspects, the PDCCH transmitted by the base station is identified based at least in part on spatial layers that are occupied by a plurality of REGs included in the REG bundle.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
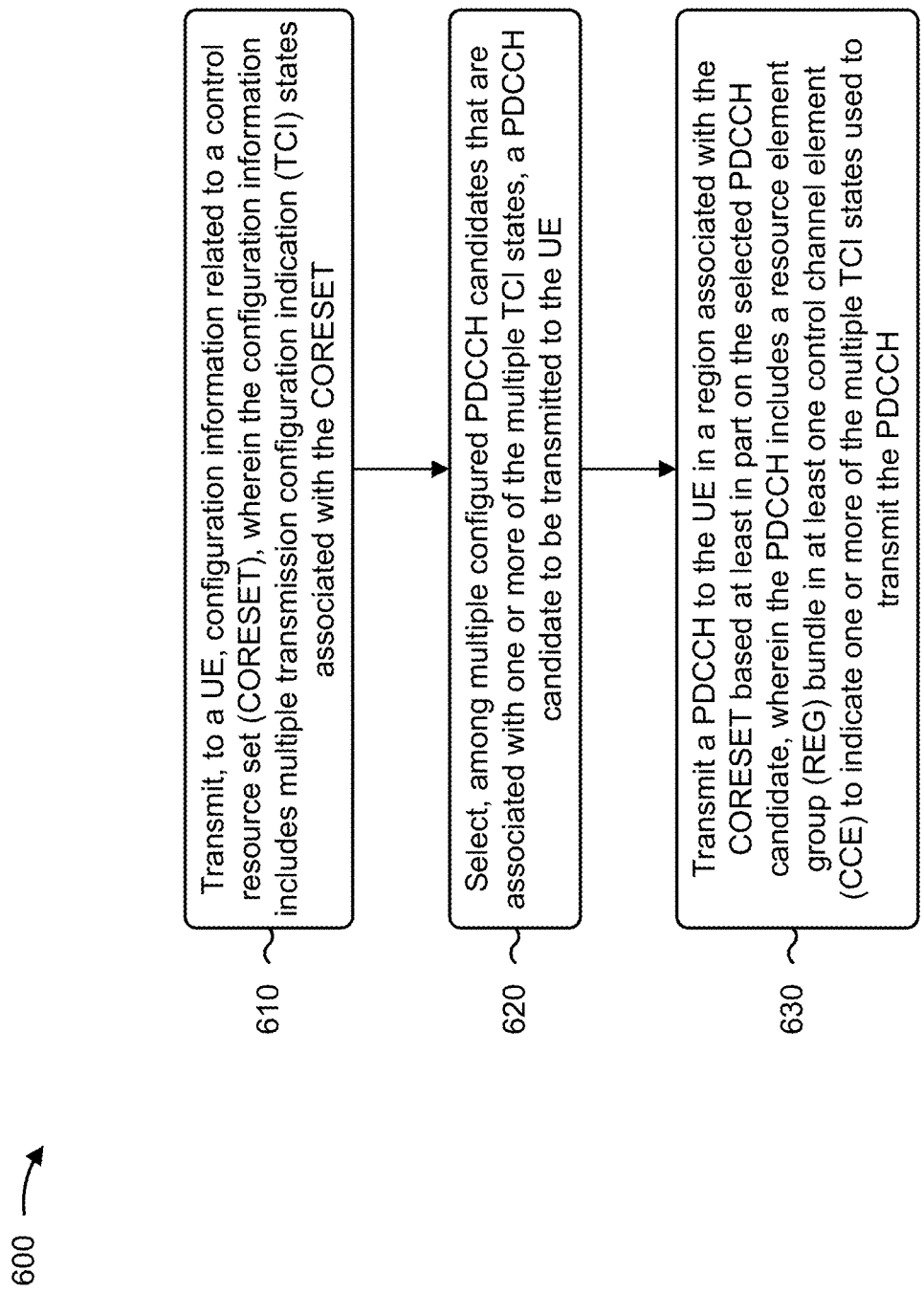
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with dynamically switching TCI states using a single CORESET.

As shown in FIG. 6, in some aspects, process 600 may include transmitting, to a UE, configuration information related to a CORESET, wherein the configuration information includes multiple TCI states associated with the CORESET (block 610). For example, the base station may transmit (e.g., using controller/processor 240, transmit processor 220, TX MIMO processor 230, MOD 232, antenna 234, and/or the like), to a UE, configuration information related to a CORESET, as described above. In some aspects, the configuration information includes multiple TCI states associated with the CORESET.

As further shown in FIG. 6, in some aspects, process 600 may include selecting, among multiple configured PDCCH candidates including that are associated with one or more of the multiple TCI states, a PDCCH candidate to be transmitted to the UE (block 620). For example, the base station may select (e.g., using controller/processor 240, memory 242, and/or the like), among multiple configured PDCCH candidates that are associated with one or more of the multiple TCI states, a PDCCH candidate to be transmitted to the UE, as described above.

As further shown in FIG. 6, in some aspects, process 600 may include transmitting a PDCCH to the UE in a region associated with the CORESET based at least in part on the selected PDCCH candidate, wherein the PDCCH includes an REG bundle in at least one CCE to indicate one or more of the multiple TCI states used to transmit the PDCCH (block 630). For example, the base station may transmit (e.g., using controller/processor 240, transmit processor 220, TX MIMO processor 230, MOD 232, antenna 234, and/or the like) a PDCCH to the UE in a region associated with the CORESET based at least in part on the selected PDCCH candidate, as described above. In some aspects, the PDCCH includes an REG bundle in at least one CCE to indicate one or more of the multiple TCI states used to transmit the PDCCH.

Process 600 may include additional aspects, such as any single aspect or any combination of aspects described below and/or in connection with one or more other processes described elsewhere herein.

In a first aspect, the REG bundle included in the at least one CCE indicates a CCE type associated with the at least one CCE, and the one or more TCI states used to transmit the PDCCH are indicated based at least in part on the CCE type associated with the at least one CCE.

In a second aspect, alone or in combination with the first aspect, the CCE type is one of multiple CCE types including at least a first CCE type associated with a first TCI state and a second CCE type associated with a second TCI state, and the first TCI state and the second TCI state are included among the multiple TCI states associated with the CORESET.

In a third aspect, alone or in combination with one or more of the first and second aspects, the multiple CCE types further include a third CCE type associated with the first TCI state and the second TCI state.

In a fourth aspect, alone or in combination with one or more of the first through third aspects, process 600 includes configuring the at least one CCE to indicate that the PDCCH is associated with one of the multiple TCI states associated with the CORESET based at least in part on the REG bundle including a plurality of REGs that are all associated with the one TCI state.

In a fifth aspect, alone or in combination with one or more of the first through fourth aspects, process 600 includes configuring the at least one CCE to indicate that the PDCCH is associated with at least two of the multiple TCI states associated with the CORESET based at least in part on the REG bundle including a first set of REGs that are associated with a first TCI state and a second set of REGs that are associated with a second TCI state.

In a sixth aspect, alone or in combination with one or more of the first through fifth aspects, the at least one CCE indicates the one or more TCI states used to transmit the PDCCH based at least in part on frequency resources that are occupied by a plurality of REGs included in the REG bundle.

In a seventh aspect, alone or in combination with one or more of the first through sixth aspects, the at least one CCE indicates the one or more TCI states used to transmit the PDCCH based at least in part on time resources that are occupied by a plurality of REGs included in the REG bundle.

In an eighth aspect, alone or in combination with one or more of the first through seventh aspects, the at least one CCE indicates the one or more TCI states used to transmit the PDCCH based at least in part on spatial layers that are occupied by a plurality of REGs included in the REG bundle.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of aspects of the present disclosure:

Aspect 1: A method of wireless communication performed by a UE, comprising: receiving, from a base station, configuration information related to a CORESET, wherein the configuration information includes multiple transmission TCI states associated with the CORESET; receiving, from the base station, a PDCCH in a region associated with the CORESET, wherein the PDCCH includes at least one CCE; performing blind decoding for multiple configured PDCCH candidates based at least in part on an REG bundle included in the at least one CCE, wherein the multiple configured PDCCH candidates are associated with one or more of the multiple TCI states associated with the CORESET; and identifying the PDCCH transmitted by the base station based at least in part on the blind decoding.

Aspect 2: The method of aspect 1, further comprising: determining a CCE type associated with the at least one CCE based at least in part on the REG bundle included in the at least one CCE, wherein the PDCCH transmitted by the base station is identified based at least in part on the CCE type associated with the at least one CCE.

Aspect 3: The method of aspect 2, wherein the CCE type is one of multiple CCE types including at least a first CCE type associated with a first TCI state and a second CCE type associated with a second TCI state, and wherein the first TCI state and the second TCI state are included among the multiple TCI states associated with the CORESET.

Aspect 4: The method of aspect 3, wherein the multiple CCE types further include a third CCE type associated with the first TCI state and the second TCI state.

Aspect 5: The method of any one of aspects 1-4, further comprising: determining that the at least one CCE is associated with one of the multiple TCI states associated with the CORESET based at least in part on the REG bundle including a plurality of REGs that are all associated with the one TCI state.

Aspect 6: The method of any one of aspects 1-4, further comprising: determining that the at least one CCE is associated with at least two of the multiple TCI states associated with the CORESET based at least in part on the REG bundle including a first set of REGs associated with a first TCI state and a second set of REGs associated with a second TCI state.

Aspect 7: The method of any one of aspects 1-6, wherein the PDCCH transmitted by the base station is identified based at least in part on frequency resources that are occupied by a plurality of REGs included in the REG bundle.

Aspect 8: The method of any one of aspects 1-6, wherein the PDCCH transmitted by the base station is identified based at least in part on time resources that are occupied by a plurality of REGs included in the REG bundle.

Aspect 9: The method of any one of aspects 1-6, wherein the PDCCH transmitted by the base station is identified based at least in part on spatial layers that are occupied by a plurality of REGs included in the REG bundle.

Aspect 10: A method of wireless communication performed by a base station, comprising: transmitting, to a UE, configuration information related to a CORESET, wherein the configuration information includes multiple TCI states associated with the CORESET; selecting, among multiple configured PDCCH candidates that are associated with one or more of the multiple TCI states, a PDCCH candidate to be transmitted to the UE; and transmitting a PDCCH to the UE in a region associated with the CORESET based at least in part on the selected PDCCH candidate, wherein the PDCCH includes an REG bundle in at least one CCE to indicate one or more of the multiple TCI states used to transmit the PDCCH.

Aspect 11: The method of aspect 10, wherein the REG bundle included in the at least one CCE indicates a CCE type associated with the at least one CCE, and wherein the one or more TCI states used to transmit the PDCCH are indicated based at least in part on the CCE type associated with the at least one CCE.

Aspect 12: The method of aspect 11, wherein the CCE type is one of multiple CCE types including at least a first CCE type associated with a first TCI state and a second CCE type associated with a second TCI state, and wherein the first TCI state and the second TCI state are included among the multiple TCI states associated with the CORESET.

Aspect 13: The method of aspect 12, wherein the multiple CCE types further include a third CCE type associated with the first TCI state and the second TCI state.

Aspect 14: The method of any one of aspects 10-13, further comprising: configuring the at least one CCE to indicate that the PDCCH is associated with one of the multiple TCI states associated with the CORESET based at least in part on the REG bundle including a plurality of REGs that are all associated with the one TCI state.

Aspect 15: The method of any one of aspects 10-13, further comprising: configuring the at least one CCE to indicate that the PDCCH is associated with at least two of the multiple TCI states associated with the CORESET based at least in part on the REG bundle including a first set of REGs that are associated with a first TCI state and a second set of REGs that are associated with a second TCI state.

Aspect 16: The method of any one of aspects 10-15, wherein the at least one CCE indicates the one or more TCI states used to transmit the PDCCH based at least in part on frequency resources that are occupied by a plurality of REGs included in the REG bundle.

Aspect 17: The method of any one of aspects 10-15, wherein the at least one CCE indicates the one or more TCI states used to transmit the PDCCH based at least in part on time resources that are occupied by a plurality of REGs included in the REG bundle.

Aspect 18: The method of any one of aspects 10-15, wherein the at least one CCE indicates the one or more TCI states used to transmit the PDCCH based at least in part on spatial layers that are occupied by a plurality of REGs included in the REG bundle.

Aspect 19: An apparatus for wireless communication at a device, comprising a processor; memory coupled with the processor; and instructions stored in the memory and executable by the processor to cause the apparatus to perform the method of one or more aspects of aspects 1-9.

Aspect 20: A device for wireless communication, comprising a memory and one or more processors coupled to the memory, the memory and the one or more processors configured to perform the method of one or more aspects of aspects 1-9.

Aspect 21: An apparatus for wireless communication, comprising at least one means for performing the method of one or more aspects of aspects 1-9.

Aspect 22: A non-transitory computer-readable medium storing code for wireless communication, the code comprising instructions executable by a processor to perform the method of one or more aspects of aspects 1-9.

Aspect 23: A non-transitory computer-readable medium storing a set of instructions for wireless communication, the set of instructions comprising one or more instructions that, when executed by one or more processors of a device, cause the device to perform the method of one or more aspects of aspects 1-9.

Aspect 24: An apparatus for wireless communication at a device, comprising a processor; memory coupled with the processor; and instructions stored in the memory and executable by the processor to cause the apparatus to perform the method of one or more aspects of aspects 10-18.

Aspect 25: A device for wireless communication, comprising a memory and one or more processors coupled to the memory, the memory and the one or more processors configured to perform the method of one or more aspects of aspects 10-18.

Aspect 26: An apparatus for wireless communication, comprising at least one means for performing the method of one or more aspects of aspects 10-18.

Aspect 27: A non-transitory computer-readable medium storing code for wireless communication, the code comprising instructions executable by a processor to perform the method of one or more aspects of aspects 10-18.

Aspect 28: A non-transitory computer-readable medium storing a set of instructions for wireless communication, the set of instructions comprising one or more instructions that, when executed by one or more processors of a device, cause the device to perform the method of one or more aspects of aspects 10-18.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a network entity, configuration information related to a control resource set (CORESET), wherein the configuration information includes multiple transmission configuration indication (TCI) states associated with the CORESET;
receiving, from the network entity, a physical downlink control channel (PDCCH) in a region associated with the CORESET, wherein the PDCCH includes at least one control channel element (CCE);
performing blind decoding for multiple configured PDCCH candidates based at least in part on the multiple TCI states associated with the CORESET and based at least in part on a resource element group (REG) bundle included in the at least one CCE, wherein the multiple configured PDCCH candidates are associated with one or more of the multiple TCI states associated with the CORESET; and
identifying the PDCCH transmitted by the network entity based at least in part on the blind decoding.

2. The method of claim 1, further comprising:
determining a CCE type associated with the at least one CCE based at least in part on the REG bundle included in the at least one CCE, wherein the PDCCH transmitted by the network entity is identified based at least in part on the CCE type associated with the at least one CCE.

3. The method of claim 2, wherein the CCE type is one of multiple CCE types including at least a first CCE type associated with a first TCI state and a second CCE type associated with a second TCI state, and wherein the first TCI state and the second TCI state are included among the multiple TCI states associated with the CORESET.

4. The method of claim 3, wherein the multiple CCE types further include a third CCE type associated with the first TCI state and the second TCI state.

5. The method of claim 1, further comprising:
determining that the at least one CCE is associated with one of the multiple TCI states associated with the CORESET based at least in part on the REG bundle including a plurality of REGs that are all associated with the one TCI state.

6. The method of claim 1, further comprising:
determining that the at least one CCE is associated with at least two of the multiple TCI states associated with the CORESET based at least in part on the REG bundle including a first set of REGs associated with a first TCI state and a second set of REGs associated with a second TCI state.

7. The method of claim 1, wherein the PDCCH transmitted by the network entity base station is identified based at least in part on frequency resources that are occupied by a plurality of REGs included in the REG bundle.

8. The method of claim 1, wherein the PDCCH transmitted by the network entity is identified based at least in part on time resources that are occupied by a plurality of REGs included in the REG bundle.

9. The method of claim 1, wherein the PDCCH transmitted by the network entity is identified based at least in part on spatial layers that are occupied by a plurality of REGs included in the REG bundle.

10. A method of wireless communication performed by a network entity, comprising:
transmitting, to a user equipment (UE), configuration information related to a control resource set (CORESET), wherein the configuration information includes multiple transmission configuration indication (TCI) states associated with the CORESET;
selecting, among multiple configured physical downlink control channel (PDCCH) candidates that are associated with at least one of the multiple TCI states, a PDCCH candidate associated with one or more TCI states of the multiple TCI states, the one or more TCI states to be used to transmit a PDCCH to the UE; and
transmitting the PDCCH to the UE in a region associated with the CORESET based at least in part on the selected PDCCH candidate, wherein the PDCCH includes a resource element group (REG) bundle in at least one control channel element (CCE) to indicate the one or more TCI states used to transmit the PDCCH.

11. The method of claim 10, wherein the REG bundle included in the at least one CCE indicates a CCE type associated with the at least one CCE, and wherein the one or more TCI states used to transmit the PDCCH are indicated based at least in part on the CCE type associated with the at least one CCE.

12. The method of claim 11, wherein the CCE type is one of multiple CCE types including at least a first CCE type associated with a first TCI state and a second CCE type associated with a second TCI state, and wherein the first TCI state and the second TCI state are included among the multiple TCI states associated with the CORESET.

13. The method of claim 12, wherein the multiple CCE types further include a third CCE type associated with the first TCI state and the second TCI state.

14. The method of claim 10, further comprising:
configuring the at least one CCE to indicate that the PDCCH is associated with one of the multiple TCI states associated with the CORESET based at least in part on the REG bundle including a plurality of REGs that are all associated with the one TCI state.

15. The method of claim 10, further comprising:
configuring the at least one CCE to indicate that the PDCCH is associated with at least two of the multiple TCI states associated with the CORESET based at least in part on the REG bundle including a first set of REGs that are associated with a first TCI state and a second set of REGs that are associated with a second TCI state.

16. The method of claim 10, wherein the at least one CCE indicates the one or more TCI states used to transmit the PDCCH based at least in part on frequency resources that are occupied by a plurality of REGs included in the REG bundle.

17. The method of claim 10, wherein the at least one CCE indicates the one or more TCI states used to transmit the PDCCH based at least in part on time resources that are occupied by a plurality of REGs included in the REG bundle.

18. The method of claim 10, wherein the at least one CCE indicates the one or more TCI states used to transmit the PDCCH based at least in part on spatial layers that are occupied by a plurality of REGs included in the REG bundle.

19. A user equipment (UE) for wireless communication, comprising:
a memory; and
one or more processors, coupled to the memory, configured to:
receive, from a network entity, configuration information related to a control resource set (CORESET), wherein the configuration information includes multiple transmission configuration indication (TCI) states associated with the CORESET;
receive, from the network entity, a physical downlink control channel (PDCCH) in a region associated with the CORESET, wherein the PDCCH includes at least one control channel element (CCE);
perform blind decoding for multiple configured PDCCH candidates based at least in part on the multiple TCI states associated with the CORESET and based at least in part on a resource element group (REG) bundle included in the at least one CCE, wherein the multiple configured PDCCH candidates are associated with one or more of the multiple TCI states associated with the CORESET; and
identify the PDCCH transmitted by the network entity based at least in part on the blind decoding.

20. The UE of claim 19, wherein the one or more processors are further configured to:
determine a CCE type associated with the at least one CCE based at least in part on the REG bundle included in the at least one CCE, wherein the PDCCH transmitted by the network entity is identified based at least in part on the CCE type associated with the at least one CCE.

21. The UE of claim 20, wherein the CCE type is one of multiple CCE types including at least a first CCE type associated with a first TCI state, a second CCE type associated with a second TCI state, and a third CCE type associated with the first TCI state and the second TCI state, and wherein the first TCI state and the second TCI state are included among the multiple TCI states associated with the CORESET.

22. The UE of claim 19, wherein the one or more processors are further configured to:
   determine that the at least one CCE is associated with of the multiple TCI states associated with the CORESET based at least in part on the REG bundle including a plurality of REGs that are all associated with the one TCI state.

23. The UE of claim 19, wherein the one or more processors are further configured to:
   determine that the at least one CCE is associated with at least two of the multiple TCI states associated with the CORESET based at least in part on the REG bundle including a first set of REGs associated with a first TCI state and a second set of REGs associated with a second TCI state.

24. The UE of claim 19, wherein the PDCCH transmitted by the network entity is identified based at least in part on frequency resources that are occupied by a plurality of REGs included in the REG bundle.

25. A network entity for wireless communication, comprising:
   a memory; and
   one or more processors, coupled to the memory, configured to:
      transmit, to a user equipment (UE), configuration information related to a control resource set (CORESET), wherein the configuration information includes multiple transmission configuration indication (TCI) states associated with the CORESET;
      select, among multiple configured physical downlink control channel (PDCCH) candidates that are associated with one or more at least one of the multiple TCI states, a PDCCH candidate associated with TCI states of the multiple TCI states, the one or more TCI states to be used to transmit a PDCCH to the UE; and
      transmit the PDCCH to the UE in a region associated with the CORESET based at least in part on the selected PDCCH candidate, wherein the PDCCH includes a resource element group (REG) bundle in at least one control channel element (CCE) to indicate the one or more TCI states used to transmit the PDCCH.

26. The network entity of claim 25, wherein the REG bundle included in the at least one CCE indicates a CCE type associated with the at least one CCE, and wherein the one or more TCI states used to transmit the PDCCH are indicated based at least in part on the CCE type associated with the at least one CCE.

27. The network entity of claim 26, wherein the CCE type is one of multiple CCE types including at least a first CCE type associated with a first TCI state, a second CCE type associated with a second TCI state, and a third CCE type associated with the first TCI state and the second TCI state, and wherein the first TCI state and the second TCI state are included among the multiple TCI states associated with the CORESET.

28. The network entity of claim 25, wherein the one or more processors are further configured to:
   configure the at least one CCE to indicate that the PDCCH is associated with one of the multiple TCI states associated with the CORESET based at least in part on the REG bundle including a plurality of REGs that are all associated with the one TCI state.

29. The network entity of claim 25, wherein the one or more processors are further configured to:
   configure the at least one CCE to indicate that the PDCCH is associated with at least two of the multiple TCI states associated with the CORESET based at least in part on the REG bundle including a first set of REGs that are associated with a first TCI state and a second set of REGs that are associated with a second TCI state.

30. The network entity of claim 25, wherein the at least one CCE indicates the one or more TCI states used to transmit the PDCCH based at least in part on frequency resources that are occupied by a plurality of REGs included in the REG bundle.

* * * * *